United States Patent [19]

Ansgar et al.

[11] Patent Number: 4,815,329
[45] Date of Patent: Mar. 28, 1989

[54] RACK AND PINION STEERING MECHANISM

[75] Inventors: Betz Ansgar, Schw.-Gmünd; Hägele Gerhard, Hohenstadt, both of Fed. Rep. of Germany

[73] Assignee: Zahnradfabrik Friedrichshafen, Ag., Friedrichsafen, Fed. Rep. of Germany

[21] Appl. No.: 857,743

[22] PCT Filed: Jul. 30, 1985

[86] PCT No.: PCT/EP85/00383
§ 371 Date: Mar. 28, 1986
§ 102(e) Date: Mar. 28, 1986

[87] PCT Pub. No.: WO86/01168
PCT Pub. Date: Feb. 27, 1986

[30] Foreign Application Priority Data
Aug. 9, 1984 [LU] Luxembourg .................. 84/00239

[51] Int. Cl.$^4$ ............................................. F16H 1/04
[52] U.S. Cl. ......................................... 74/422; 74/498
[58] Field of Search ................ 74/422, 89, 17, 498; 464/180

[56] References Cited

U.S. PATENT DOCUMENTS

| 3,745,850 | 7/1973 | Bayle | 74/422 |
| 3,844,182 | 10/1974 | Bradshaw et al. | 74/422 X |
| 4,016,774 | 4/1977 | Baker et al. | 74/422 X |
| 4,487,281 | 11/1982 | Cordiano | 74/498 X |

FOREIGN PATENT DOCUMENTS

| 351036 | 5/1928 | Belgium . | |
| 2223008 | 5/1971 | Fed. Rep. of Germany | 74/498 |
| 2748011 | 11/1978 | Fed. Rep. of Germany | 74/422 |
| 1547147 | 10/1968 | Italy . | |
| 674749 | 7/1949 | United Kingdom . | |
| 1104205 | 2/1968 | United Kingdom . | |
| 1340882 | 12/1973 | United Kingdom | 74/498 |
| 2037931 | 7/1980 | United Kingdom . | |

Primary Examiner—Dave W. Arola
Attorney, Agent, or Firm—Albert M. Zalkind

[57] ABSTRACT

A conventional rack and pinion vehicle steering mechanism of the kind having a spring biased pressure member for compensating for tooth wear has a non-rotative friction spring biased against a coacting frictional torque resistance that prevents the pinion from transmitting oscillatory to-and-fro vibratory movement of the rack to the steering spindle through the pinion. The result is the avoidance of steering wheel shimmy otherwise felt by the vehicle operator.

15 Claims, 1 Drawing Sheet

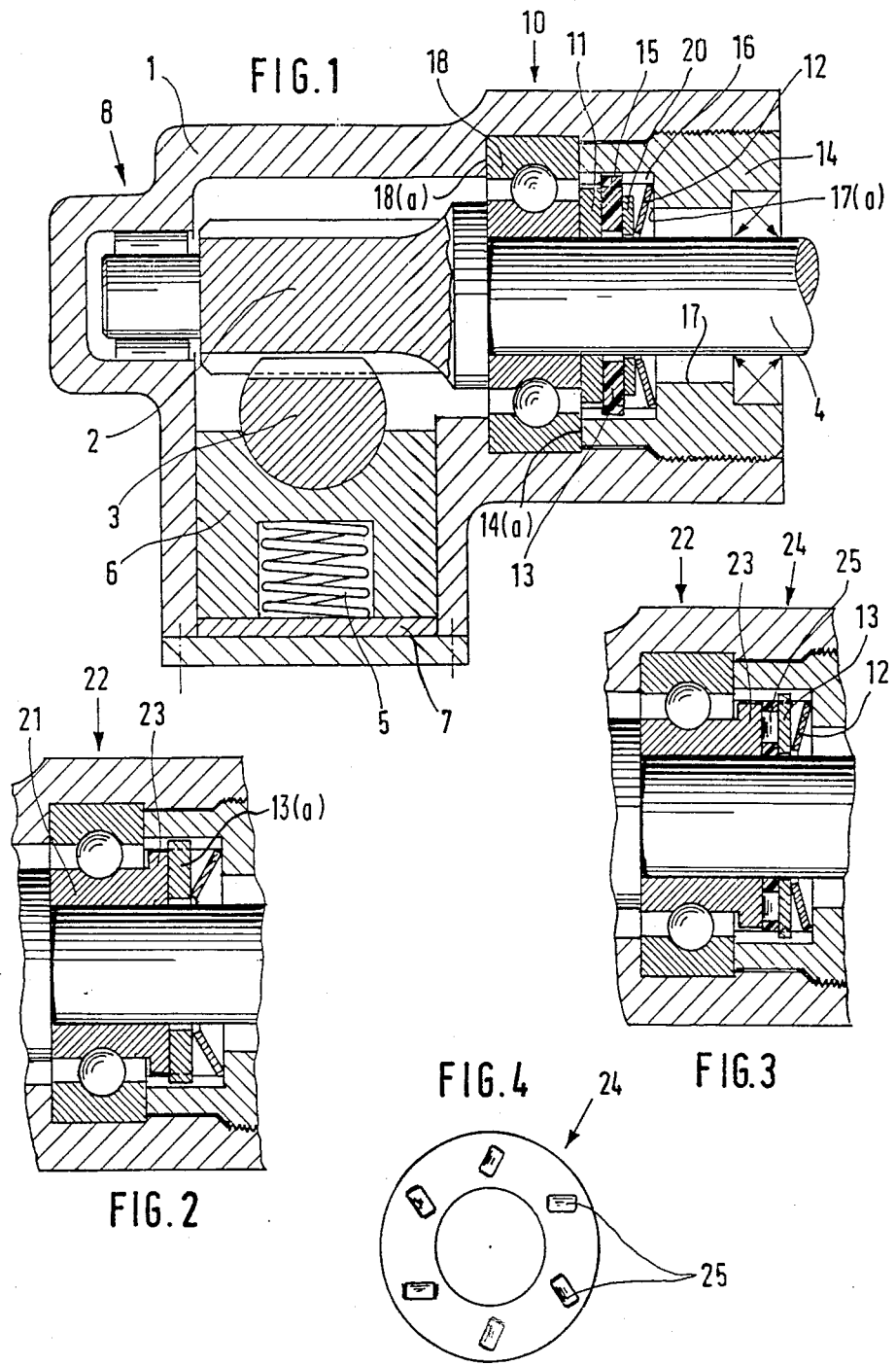

RACK AND PINION STEERING MECHANISM

BACKGROUND OF THE INVENTION

In rack and pinion steering, commonly used in passenger cars, e.g., as shown in British Pat. No. 2,037,931A of July 16, 1980 a rack is spring biased against a steering spindle pinion. Such arrangement suffices to maintain constant tooth engagement between rack and pinion, avoiding clattering noises. Also, the arrangement effects damping of axial vibration of the rack and thus avoids torsional oscillation of the steering spindle. Such oscillations cause imprecise steering due to so called steering wheel shimmy, an effect occurring at certain speeds caused by movement of unbalanced mass. The almost undamped shimmy effect makes for steering discomfort to the driver of the vehicle and also causes increased wear of the steering elements. Ordinarily, to correct such a condition, would be obvious to merely increase the spring pressure of the rack against the pinion by suitable adjustments. However, such expedient is impractical because the increase of frictional engagement between the meshed teeth of rack and pinion on unworn tooth areas would cause much too stiff steering in addition to increased tooth wear.

BRIEF DESCRIPTION OF THE INVENTION

The present invention provides an arrangement for effecting a torsional frictional load on the steering spindle to damp torsional oscillation while not causing any tooth wear of the rack and pinion nor steering stiffness due to forced tooth engagement.

Various embodiments of the invention are disclosed, but the general principle is to provide coacting friction members maintained in frictional engagement by a spring the pressure of which can be predetermined to precisely meet and overcome shimmy tendency. The friction members are located close to an antifriction bearing adjacent the pinion, and in one embodiment comprises a rotary friction member fixed to the steering spindle and abutting a part of the antifriction bearing. A friction plate is carried non-rotatively in a counter bore of a sleeve threaded into the steering housing. The sleeve has a disc spring therein that biases the non-rotative friction plate against the friction member fixedly carried on the steering spindle.

The non-rotative friction plate may be steel, or plastic preferably with a wear plate between it and the disc spring. The friction member fixed to the spindle may be a radial flange on the inner race of a ball bearing.

A further embodiment utilizes a roller thrust bearing between the two frictional elements wherein the thrust bearing has rollers which are slanted, i.e., not radially oriented but chordally disposed.

The invention as described above makes it possible to provide for frictional damping against spindle oscillation to minimize the effect of axial vibration of the steering rack in a manner not possible by the spring bias arrangement of rack against pinion. Also, the fictionally active engaged surfaces of the frictional members can be chosen for optimum results, not possible with rack and pinion type of spring bias. Further, where conventional ball bearings are used of the kind wherein balls run in the grooves of races, axial play is minimized to thus minimize wear.

A detailed description of the invention now follows in conjunction with the appended drawing in which:

FIG. 1 is a longitudinal section through a rack and pinion steering mechanism which illustrates one form of the invention;

FIG. 2 is a fragmentary longitudinal section illustrating a variation;

FIG. 3 is a fragmentary longitudinal section illustrating another variation; and FIG. 4 is a plan view showing a thrust bearing having slanted rollers as used in FIG. 3.

Referring to FIG. 1, there is shown a steering spindle pinion 2 in a housing 1, in engagement with rack 3. Pinion 2 is integral with, or secured to, steering spindle 4. A pressure member 6 biased by spring 5 effects tooth engagement between rack 3 and pinion 2. The spring pressure is adjustable as by a shim 7, in a known manner or by means of an adjustable screw, likewise known. Pinion 2 is supported at both ends by antifriction ball bearings 8 and 10, as shown.

Thus, far the description is conventional.

Adjacent the ball bearing 10 at the inboard end of the pinion is a rotative friction member 11, e.g., a ring or disc secured to the steering spindle 4 in any suitable manner, as by soldering, brazing, welding, etc. Such member is a coacting friction member engaging with a friction plate 13, e.g., a ring or disc. A disc spring 12 effects frictional engagement betweent he aforementioned friction plate and coacting friction member. The friction plate 13 is non-rotating being keyed for axial positioning in a sleeve 14 threaded into housing 1. To prevent rotation of friction plate 13, it has at least one key 15 slidable in a keyway 16 of sleeve 14. The spring 12, with sleeve 14 screwed in place against the outer race of bearing 10, as shown, presses friction plate 13 against friction member 11, the spring being carried in a bore 17 of sleeve 14, supported by shoulder 17a. Sleeve 14 also axially fixes the outer race 18 of ball bearing 10 at the abutment 14(a).

The bore in the sleeve terminates in an annular edge abutting the outer race of bearing 10 to fix the bearing against housing shoulder 18a.

Spring 12 is preferably made with a pretension so as to be largely independent of the assembled position of the threaded sleeve. Thus the spring is selected as having a nearly horizontal characteristic curve so as not to be affected by varying manufacturing tolerances of threaded mass produced sleeves.

If the non-rotative friction plate 13 is of a plastic material rather than steel a metal wear plate 20 can be of advantage merely inserted, without any fastening, between the spring and the friction plate. However, a fastened wear plate 20 can also be used, cemented to the plastic friction plate.

FIG. 2 differs from FIG. 1 in that the inner race 21 of ball bearing 22 has a radial flange 23 to serve as a coacting friction member, eliminating the separate member 11 of FIG. 1 and using a steel non-rotative plate.

Another variation provides for further friction effect, intermediate friction plate 13 and flange 23, as in FIGS. 3 and 4, a roller thrust bearing 24 having slanted rollers 25 is inserted. The degree of friction thus achieved may be predetermined by the degree of slant or the number of rollers 25, the friction radius, and the pressure force of spring 12. It will be understood that instead of a radial flange 23 of the inner race of bearing 22, a separate coacting friction member 11 may be used as in FIG. 1.

From the preceding description it will be recognized that the frictional resistance is adjustable i.e., predetermined by use of a disc spring of any desired selected strength have a substantially horizontal characteristic curve, optionally in conjunction with a slanted rolled thrust bearing.

We claim:

1. A rack and pinion steering mechanism of the kind having a housing (1) supporting a pinion (2) therein which is connected to a steering spindle (4), engaging a rack (3), including a spring biased pressure member (6) engaging the rack for tooth wear compensation between the rack and pinion wherein the pinion is supported in the housing by bearing means comprising a bearing (10) having an outer race (18) and an inner race (21); and wherein the outer race is fixed in position relative to the housing and the inner race is rotative with the pinion; the improvement which comprises: spring biased friction means disposed to exert a frictional torque resisting force on said steering spindle to effect damping of oscillations of the rack being transmitted through said pinion to the steering spindle;

a sleeve (14) non-rotatively fixed in said housing and having a bore (17) encompassing said spring biased friction means.

2. A rack and pinion mechanism as set forth in claim 1, said spring biased friction means comprising a friction plate (13) and means (15,16) whereby said friction plate is keyed against rotation in said housing; said spring biased friction means comprising a coacting frictional member (11) (23) fixed to said steering spindle and frictionally engaged by said friction plate; and a spring (12) biasing said friction plate toward frictional engagement with said coacting frictional member.

3. A rack and pinion mechanism as set forth in claim 2, wherein said friction plate is axially shiftable by the force of said spring to effect said frictional engagement.

4. A rack and pinion mechanism as set forth in claim 2, said spring being a disk spring (12) and said bore having a shoulder (17a) abutting said spring to stress said spring for effecting a pressure against said friction plate.

5. A rack and pinion mechanism as set forth in claim 2, wherein said friction plate is plastic, and including a protective plate (20) intermediate said spring and said friction plate.

6. A rack and pinion mechanism as set forth in claim 2, said housing having a shoulder (18a) and said sleeve having an annular terminating edge; said sleeve being thready secured in said housing and said edge abutting said outer race to clamp said outer race against said shoulder in said housing.

7. A rack and pinion mechanism as set forth in claim 2, including a longitudinal groove (16) in said housing and a key (15) on said coacting frictional member friction plate (13) effecting a slidable keyway between said friction plate and said housing.

8. A rack and pinion mechanism as set forth in claim 2, wherein said coacting frictional member is a ring (11) secured fixedly on said steering spindle.

9. A rack and pinion mechanism as set forth in claim 2, wherein said inner race (21) has a radial side flange (23) effecting said coacting frictional member.

10. A rack and pinion mechanism as set forth in claim 2; including a thrust bearing (24) having nonradially disposed rollers (25) intermediate said coating frictional member (11,23) and said friction plate (13) whereby the slant of said rollers effects frictional torque resistance.

11. In a steering mechanism, especially for motor vehicles, having a steering spindle (4) and friction means acting on said spindle to effect steering resistance in the operation of said steering spindle;

including a housing (1) having therein a pinion (2) engaging a a rack (3); said steering spindle being connected to said pinion and extending into said housing supported on a radial bearing (10) having an inner and outer race; the improvement comprising: said housing having an abutment (18a); a sleeve (14) threadedly engaged in said housing and engaging an outer race of said bearing to non-rotatively fix said sleeve by tightening and the position of said bearing against said abutment; an axially movable friction plate (13) keyed non-rotatively in said sleeve; a second friction plate (11,23) secured to said steering spindle within said sleeve; an inner race of said bearing being secured to said steering spindle to rotate therewith; said friction means including said friction plates and a spring (12); said spring being stressed responsive to the position of said sleeve in said housing and acting on said axially movable friction plate to bias said friction plates toward each other for effecting steering resistance against rotation of said spindle commensurate with the stress in said spring, wherein said sleeve has a shoulder (17a) abutting said spring for stressing thereof and a radial end surface (14a) for abutment with said outer race of said bearing to fix the position thereof in said housing non-rotatively.

12. In a steering mechanism as set forth in claim 11, said axially movable friction plate (13) being of plastic material and a wear plate (20) intermediate said spring and said movable friction plate.

13. In a steering mechanism as set forth in claim 11, wherein said second friction plate (11) comprises a radial flange (23) integral with the inner race (21) of said bearing.

14. In a steering mechanism as set forth in claim 13, including an axial roller bearing (24) having non-radially disposed rollers (25) intermediate said friction plates.

15. In a rack and pinion mechanism as set forth in claim 14, wherein said second friction plate is a radial flange (23) on the inner race (21) of said bearing (10).

* * * * *